UNITED STATES PATENT OFFICE.

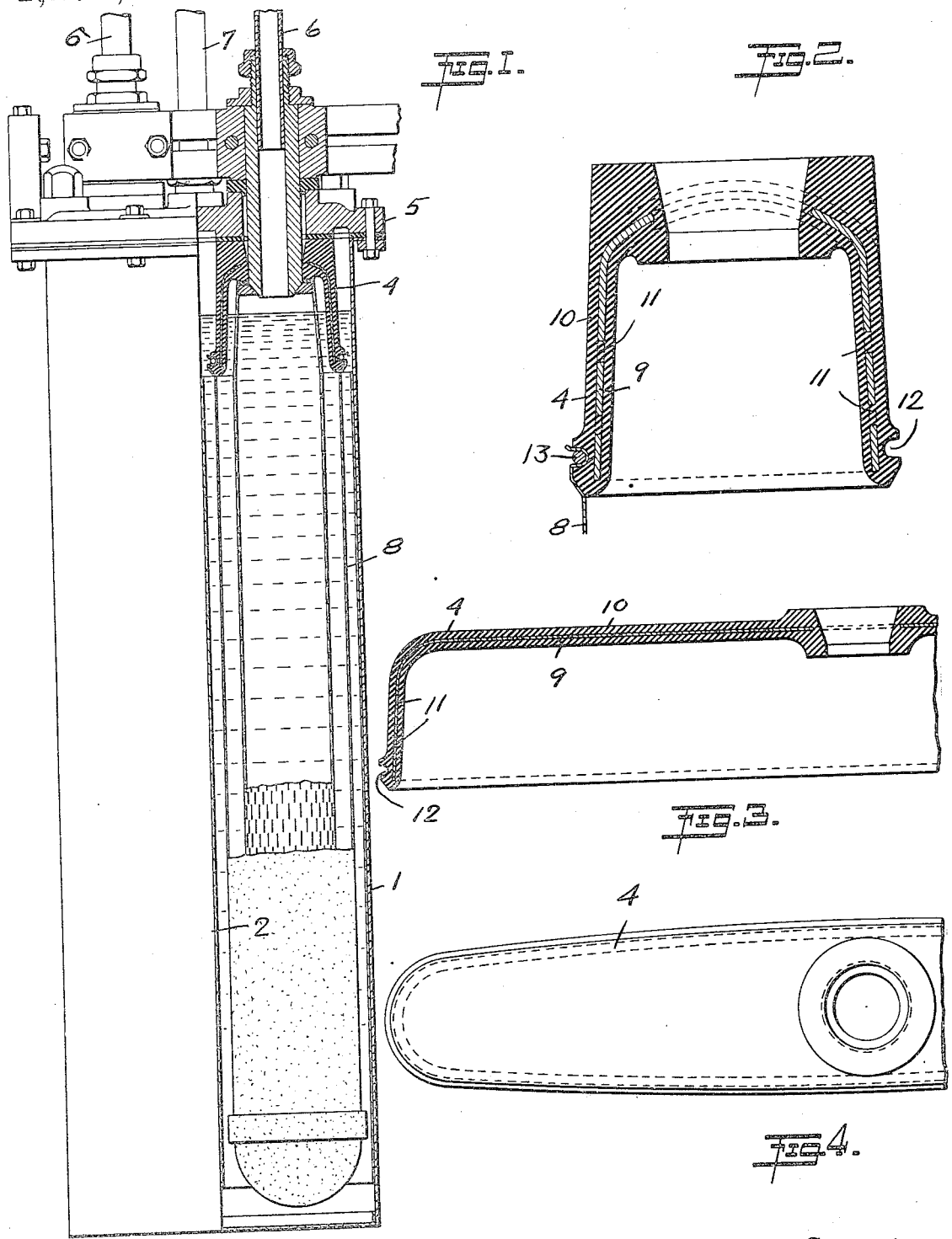

HENRY R. SWARTLEY, JR., OF MANHASSET, NEW YORK, ASSIGNOR TO DAVIS-BOURNONVILLE COMPANY, OF JERSEY CITY, NEW JERSEY, A CORPORATION OF NEW YORK.

SEPARATOR.

1,176,105.  Specification of Letters Patent.  Patented Mar. 21, 1916.

Application filed September 15, 1915. Serial No. 50,790.

*To all whom it may concern:*

Be it known that I, HENRY R. SWARTLEY, Jr., a citizen of the United States, and resident of Manhasset, Long Island, in the county of Nassau and State of New York, have invented certain new and useful Improvements in Separators, of which the following is a specification.

This invention relates to separators for electrolytic cells for the production of oxygen and hydrogen, and more especially to the separators used in cells of the type disclosed in the applications of George Halter, Serial No. 786,913, filed August 27, 1913, and Serial No. 867,593, filed October 20, 1914, and Worthy C. Bucknam, Serial No. 867,986, filed October 22, 1914. These separators are inverted trough-shaped structures which are disposed over the anodes and extend at their lower edges a suitable distance below the level of the electrolyte. From them are suspended the asbestos sacks or diaphragms, which are interposed between the electrodes below the liquid level. The separators and sacks together constitute an inclosure for confining the oxygen evolved at the anodes and preventing it from mixing with the hydrogen, which is given off at the cathode. The separators should be capable of withstanding the action of the caustic electrolyte and of the oxygen, and it is also of great importance that they be of electrical non-conducting character, in order to avoid possible electrolytic action at their surfaces, giving rise to dangerous mixed gases. For this reason metal separators are to be avoided. Stoneware has been employed for these separators, and is non-conducting, but deteriorates in time under the action of the caustic, so that if not replaced with sufficient frequency these separators become reduced to an almost soggy condition wherein they are dangerously likely to collapse and permit the gases to mix. Glass, while not entirely unsuitable, contains silica, which is subject to attack by the electrolyte. Separators of high quality vitreous porcelain present serious manufacturing difficulties. Both glass and porcelain separators also suffer the defect of fragility, rendering them liable to breakage by the compressive force used to clamp them to the cover or by shocks to which they may be subjected prior to their assemblage in the cells or in event of overhauling or repair. Hard rubber is not affected at all by the caustic or by the oxygen, but separators made of this material have not sufficient strength and rigidity, particularly when heated as a result of the operation of the cells, to resist certain stresses imposed upon them, such as, for example, the constrictive effort applied to clamp the asbestos sacks in place. In accordance with the present invention I make a separator with a core of metal and a covering of hard rubber. In this way I combine two materials, which, separately, for different reasons are fatally unsuited for the purpose, and produce a thoroughly practical and efficient structure.

In the accompanying drawing: Figure 1 is a view half in end elevation and half in vertical section, showing a cell of the type referred to with my improved separator therein; Fig. 2 is an enlarged vertical cross-section through the separator; Fig. 3 is a fragmentary vertical longitudinal section through the separator; and Fig. 4 is a partial plan view thereof.

The cell construction shown in Fig. 1, forming the subject-matter of other applications, may be described briefly. The tank 1, which with a central partition 2 constitutes the cathode, contains two anodes 3, of which one is shown. The anodes, together with the separators 4, are supported from a cover 5; and the oxygen is taken off from the interior of the separators through ducts 6, while another duct 7 is for the hydrogen, which collects beneath the cover. From each separator is suspended an asbestos sack 8, inclosing the corresponding anode below the surface of the electrolyte. The separator, which is of the characteristic form shown, comprises a core 9 of sheet metal and a covering 10 of rubber. The core may be drawn in a press to the desired shape, the rubber is applied in a plastic condition, and the whole structure is then subjected to vulcanizing. The core is preferably provided with openings 11, whereby the rubber is keyed in place. By this construction I secure high mechanical strength, as to all stresses which a separator may be called upon to withstand, and excellent insulating and resisting qualities, in addition to which there is the advantage that the shape of the separator can be controlled to within very close limits, which is not the case when the separators are made of earthenware for example. The construction also lends itself to a more secure mode of fastening the asbestos sacks, since a groove 12 may be molded in the rubber on the outside and near the bottom of the separator, to receive the upper edge of the sack and a clamping wire 13. The core 9, by reason of its material and shape, affords a rigid backing, against the resistance of which the wire may be tightened by a turnbuckle or the like, to any necessary degree, without danger of breakage; but as a matter of fact the groove, which is made possible by this construction, contributes so effectively to the holding of the sack that a great degree of pressure is not required.

What I claim as new is:

1. A separator for electrolytic cells comprising a metal core and a covering of hard rubber.

2. A separator for electrolytic cells comprising a metal core and a covering of hard rubber, the latter being provided on the outside and near the bottom with a groove substantially as and for the purpose set forth.

HENRY R. SWARTLEY, Jr.